United States Patent
Kong et al.

(10) Patent No.: US 12,086,690 B2
(45) Date of Patent: Sep. 10, 2024

(54) QUANTUM COMPUTER ARCHITECTURE SYSTEM

(71) Applicant: ORIGIN QUANTUM COMPUTING TECHNOLOGY (HEFEI) CO., LTD, Anhui (CN)

(72) Inventors: Weicheng Kong, Anhui (CN); Xuebai Li, Anhui (CN)

(73) Assignee: ORIGIN QUANTUM COMPUTING TECHNOLOGY (HEFEI) CO., LTD, Anhui (CN)

(*) Notice: Subject to any disclaimer, the term of this patent is extended or adjusted under 35 U.S.C. 154(b) by 0 days.

(21) Appl. No.: 18/488,935

(22) Filed: Oct. 17, 2023

(65) Prior Publication Data

US 2024/0046136 A1 Feb. 8, 2024

Related U.S. Application Data

(63) Continuation of application No. PCT/CN2022/093637, filed on May 18, 2022.

(30) Foreign Application Priority Data

May 28, 2021 (CN) .......................... 202110590262.8

(51) Int. Cl.
  *G06N 10/40* (2022.01)
  *G06N 10/20* (2022.01)
(52) U.S. Cl.
  CPC ............. *G06N 10/40* (2022.01); *G06N 10/20* (2022.01)
(58) Field of Classification Search
  None
  See application file for complete search history.

(56) References Cited

U.S. PATENT DOCUMENTS

| 2021/0357797 A1* | 11/2021 | Karalekas | ............... G06N 10/80 |
| 2022/0309371 A1* | 9/2022 | Singh | ..................... G06N 10/00 |

FOREIGN PATENT DOCUMENTS

| CN | 108701263 A | 10/2018 |
| CN | 111832144 A | 10/2020 |
| CN | 111865567 A | 10/2020 |
| CN | 112114776 A | 12/2020 |
| CN | 112214200 A | 1/2021 |
| WO | 2020126541 A1 | 6/2020 |

OTHER PUBLICATIONS

ISA China National Intellectual Property Administration, International Search Report Issued in Application No. PCT/CN2022/093637, Jun. 29, 2022, WIPO, 5 pages.

* cited by examiner

*Primary Examiner* — Feifei Yeung Lopez
(74) *Attorney, Agent, or Firm* — McCoy Russell LLP (57) ABSTRACT

A quantum computer architecture system, including: a quantum processor, including a plurality of qubits; a first integration apparatus configured to implement an execution signal and aggregation of execution results of a first quantity of qubits on the quantum processor; and a central control apparatus configured to acquire bit information of to-be-executed qubits on the quantum processor and to-be-executed information of each of the to-be-executed qubits, assign the to-be-executed information to one or more first integration apparatuses according to the bit information and the first quantity, and receive the aggregation of the execution results from the one or more the first integration apparatuses. According to the present disclosure, integration and scalability of a quantum computer can be improved.

14 Claims, 4 Drawing Sheets

QUANTUM COMPUTER ARCHITECTURE SYSTEM

CROSS-REFERENCE TO RELATED APPLICATIONS

The present application is a continuation of International Application No. PCT/CN2022/093637, filed on May 18, 2022, which claims priority to Chinese Patent Application No. 202110590262.8, entitled "Quantum Computer Architecture System" and filed with the China Patent Office on May 28, 2021, the entire contents of which are incorporated herein by reference.

TECHNICAL FIELD

The present disclosure relates to the field of quantum computing, and in particular, to a quantum computer architecture system.

BACKGROUND

A quantum computer is a physical apparatus that follows laws of quantum mechanics to perform high-speed mathematical and logical operations, store and process quantum information. The quantum computer is mainly characterized in a fast operation speed, a high capability of processing information, a wide application range, and the like. Compared with ordinary computers, the more information is processed, the more beneficial it is for the quantum computer to perform computations, and the more accurate computations can be ensured.

A quantum processor serves as a core component of the quantum computer to execute computing, and the amount of executing computing depends on a quantity of qubits, which is the smallest computing unit in the quantum processor. Each qubit requires a physical control circuit. In an existing quantum computer architecture system, the physical control circuit of each qubit is arranged individually. On the one hand, as qubits increase, physical control circuits are multiplied, which significantly increases complexity of integration of the whole quantum computer. On the other hand, scalability is limited in the case of an existing quantum computer architecture system matching with quantum processors with different quantity of qubits.

SUMMARY

An objective of the present disclosure is to provide a quantum computer architecture system, so as to address deficiencies in the related art, which can improve integration and scalability of a quantum computer.

The technical solution of the present disclosure is as follows.

A quantum computer architecture system includes: a quantum processor including a plurality of qubits, a first integration apparatus configured to implement an execution signal and aggregation of execution results of a first quantity of qubits on the quantum processor; and a central control apparatus configured to acquire bit information of to-be-executed qubits on the quantum processor and to-be-executed information of each of the to-be-executed qubits, assign the to-be-executed information to one or more first integration apparatuses according to the bit information and the first quantity, and receive the aggregation of the execution results from the one or more the first integration apparatuses.

According to the quantum computer architecture system as described above, in some embodiments, the central control apparatus includes: a first acquisition module configured to acquire the bit information of the to-be-executed qubits on the quantum processor and the to-be-executed information of each of the to-be-executed qubits; and a first control module configured to assign the to-be-executed information to the one or more first integration apparatuses according to the bit information and the first quantity, and receive the aggregation of the execution results from the one or more first integration apparatuses.

According to the quantum computer architecture system as described above, in some embodiments, the bit information includes bit quantity information and qubit identification information; and the first control module is configured to determine a to-be-assigned first integration apparatus according to a relationship between the bit quantity information and the first quantity, and assign the to-be-executed information to the determined to-be-assigned first integration apparatus according to the qubit identification information.

According to the quantum computer architecture system as described above, in some embodiments, the first integration apparatus includes: first signal modules and a second control module. A quantity of the first signal modules is the first quantity, and each of the first signal modules is configured to provide one qubit with a physical execution signal and receive an execution result signal from the qubit. The second control module connected to the first signal modules and configured to determine and send each piece of the to-be-executed information to a first signal module corresponding to the each piece of the to-be-executed information according to a relationship among the bit information, preset first signal module identification information, and the qubit identification information, and receive and send the execution result signal to the central control apparatus.

According to the quantum computer architecture system as described above, in some embodiments, the first signal modules include a signal source module and a signal acquisition module.

According to the quantum computer architecture system as described above, in some embodiments, the to-be-executed information is related to a quantum logic gate operation, a qubit parameter acquisition experimental operation, and a qubit parameter calibration experimental operation of the qubit, and the signal source module is configured to generate a physical execution signal for implementing the information related to the quantum logic gate operation, the qubit parameter acquisition experimental operation, and the qubit parameter calibration experimental operation.

According to the quantum computer architecture system as described above, in some embodiments, the to-be-executed information is related to a reading measurement operation of the qubit, and the signal source module is configured to generate a physical execution signal for implementing the reading measurement operation.

According to the quantum computer architecture system as described above, in some embodiments, the first signal modules are further configured to generate a ready signal outputted to the central control apparatus, receive a trigger signal fed back by the central control apparatus based on the ready signal, and trigger the physical execution signal to be outputted to a qubit, corresponding to the physical execution signal, on the quantum processor based on the trigger signal.

According to the quantum computer architecture system as described above, in some embodiments, the second signal module and the first signal modules are located on a backboard; and each of the first signal modules is connected to the second control module via a transmission line in the backboard.

According to the quantum computer architecture system as described above, in some embodiments, the first integration apparatus is provided in a first space region, and the central control apparatus is provided in a second space region. The second space region is different from the first space region.

According to the quantum computer architecture system as described above, in some embodiments, the first integration apparatus and the central control apparatus communicate with each other via a wired network.

According to the quantum computer architecture system as described above, in some embodiments, the quantum computer architecture system further includes a terminal configured to acquire bit information of to-be-executed qubits on the quantum processor and to-be-executed information of each of the to-be-executed qubits by compiling a quantum computing task to be executed on the quantum processor, and send the bit information and the to-be-executed information to the central control apparatus.

According to the quantum computer architecture system as described above, in some embodiments, the terminal and the central control apparatus communicate with each other via a wired network.

According to the quantum computer architecture system as described above, in some embodiments, the first integration apparatus is further configured to implement an execution signal of second-type qubits according to an execution result of first-type qubits. The first-type qubits are included in a quantum circuit forming a control condition of a logic control statement; and the second-type qubits are included in a quantum circuit forming a control execution statement of a structure of the logic control statement. The control condition depends on an execution result of the qubits of the quantum circuit representing the control condition.

According to the quantum computer architecture system as described above, in some embodiments, the central control apparatus is further configured to implement, according to an execution result of first-type qubits controlled by one of the first integration apparatuses, an execution signal of second-type qubits controlled by another of the first integration apparatuses. The first-type qubits are included in a quantum circuit forming a control condition of a logic control statement; and the second-type qubits are included in a quantum circuit forming a control execution statement of a structure of the logic control statement. The control condition depends on an execution result of the qubits of the quantum circuit representing the control condition.

According to the quantum computer architecture system as described above, in some embodiments, the central control apparatus is provided with a lookup table of correspondence among the first-type qubits, the first integration apparatus corresponding to the first-type qubits, the second-type qubits, and the first integration apparatus corresponding to the second-type qubits.

Compared with the related art, a quantum computer architecture system in the present disclosure includes: a quantum processor, a first integration apparatus, and a central control apparatus. The quantum processor includes a plurality of qubits. The first integration apparatus is configured to implement execution signals and aggregation of execution results of a first quantity of qubits on the quantum processor. The central control apparatus is configured to acquire bit information of to-be-executed qubits on the quantum processor and to-be-executed information of each of the to-be-executed qubits, assign the to-be-executed information to the one or more first integration apparatuses according to the bit information and the first quantity, and receive the aggregation of the execution results from the first integration apparatus.

According to the present disclosure, the first integration apparatus is configured to provide a first quantity of qubits on the quantum processor with execution signals and to obtain execution results and aggregation of the execution results, and the central control apparatus calls one or more of the first integration apparatuses according to obtained requirements (i.e., the bit information of the to-be-executed qubits on the quantum processor and the to-be-executed information of each of the to-be-executed qubits). The first integration apparatus is configured to cooperate with the central control apparatus and to implement execution signals and aggregation of execution results of the first quantity of qubits on the quantum processor, such that an overall integration degree of the quantum computer is improved. The first integration apparatus, the central control apparatus, and the interaction between the central control apparatus and the first integration apparatus are configured such that scalability of the whole quantum computer to adapt to an increase in a quantity of qubits in the quantum processor is improved.

BRIEF DESCRIPTION OF DRAWINGS

In order to better illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

Some embodiments described below with reference to the drawings are exemplary, are intended merely to explain the present disclosure, and shall not be construed as limitations on the present disclosure.

Figure 1:
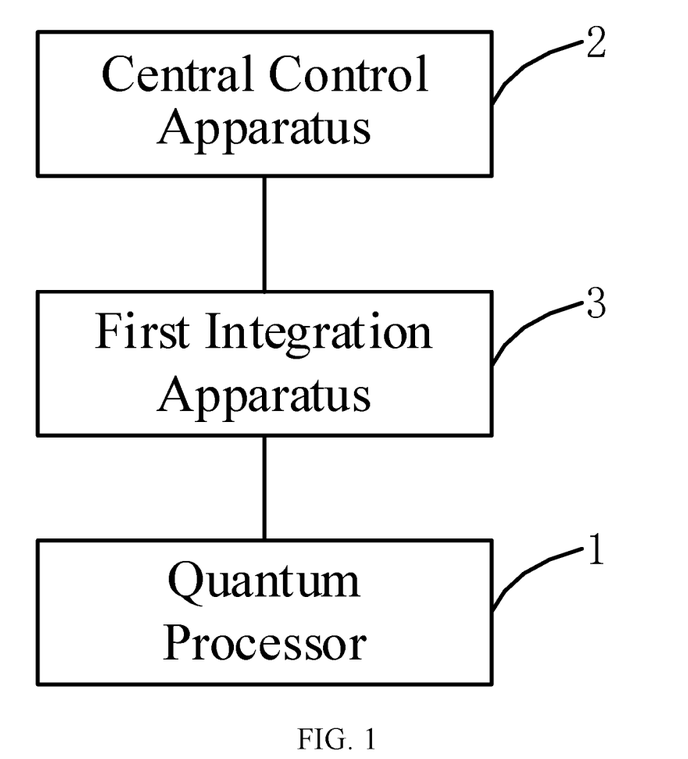
FIG. 1 is a schematic diagram of a quantum computer architecture system according to some embodiments of the present disclosure.

FIG. 1 is a schematic diagram of a quantum computer architecture system according to some embodiments of the present disclosure. According to an embodiment of the present disclosure, as shown in FIG. 1, the quantum computer architecture system includes: a quantum processor 1, one or more first integration apparatus 3, and a central control apparatus 2.

The quantum processor 1 includes a plurality of qubits. The one or more first integration apparatuses 3 is configured to implement an execution signal and aggregation of execution results of a first quantity of qubits on the quantum processor 1. The central control apparatus 2 is configured to acquire bit information of to-be-executed qubits on the quantum processor 1 and to-be-executed information of each of the to-be-executed qubits, assign the to-be-executed information to the one or more first integration apparatuses 3 according to the bit information and the first quantity, and receive the aggregation of the execution results from the one or more first integration apparatuses 3.

According to the present disclosure, the first integration apparatus is configured to provide a first quantity of qubits on the quantum processor 1 with execution signals and to obtain execution results and aggregation of the execution results, and the central control apparatus calls one or more of the first integration apparatuses according to obtained requirements (i.e., the bit information of the to-be-executed qubits on the quantum processor 1 and the to-be-executed information of each of the to-be-executed qubits). The first integration apparatus is configured to cooperate with the central control apparatus and to implement execution signals and aggregation of execution results of the first quantity of qubits on the quantum processor, such that an overall integration degree of the quantum computer is improved. The first integration apparatus, the central control apparatus, and the interaction between the central control apparatus and the first integration apparatus are configured such that scalability of the whole quantum computer to adapt to an increase in a quantity of qubits in the quantum processor is improved.

It should be noted that the quantum processor 1 includes a plurality of qubits, and the qubits are basic units for storing quantum information and performing quantum computing. There are no specific limitations on physical hardware implementation of the qubits. Exemplary qubits are superconducting qubits and semiconducting qubits.

Figure 2:
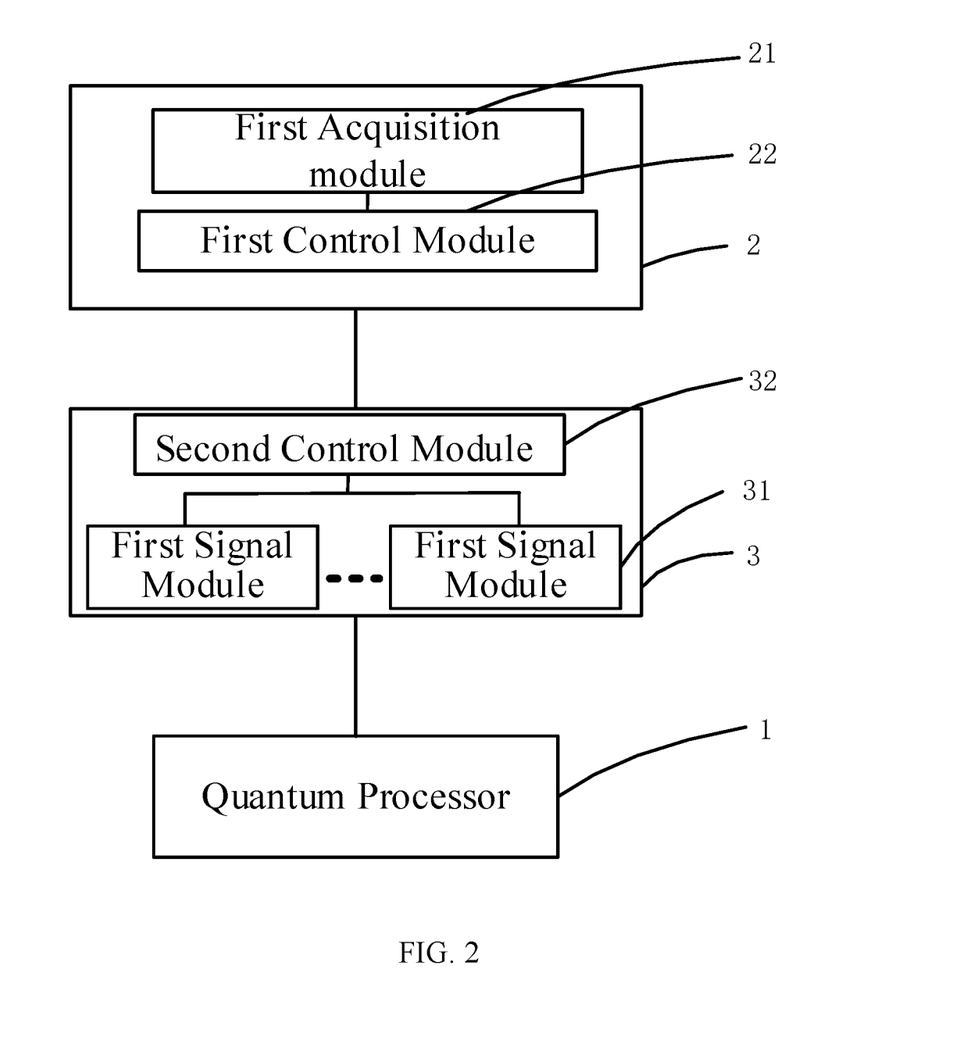
FIG. 2 is a schematic diagram of a quantum computer architecture system according to some embodiments of the present disclosure.

FIG. 2 is a schematic diagram of a quantum computer architecture system according to some embodiments of the present disclosure. As an embodiment of the present disclosure, referring to FIG. 2, the central control apparatus 2 includes a first acquisition module 21 and a first control module 22. The first acquisition module 21 is configured to acquire the bit information of the to-be-executed qubits on the quantum processor 1 and the to-be-executed information of each of the to-be-executed qubits. The first control module 22 is configured to assign the to-be-executed information to the one or more first integration apparatuses 3 according to the bit information and the first quantity, and receive the aggregation of the execution results from the one or more first integration apparatuses 3.

For example, the first acquisition module 21 can call a specific device through an interface to acquire the bit information of the to-be-executed qubits on the quantum processor 1 and the to-be-executed information of each of the to-be-executed qubits. Exemplarily, the specific device is a device that obtains the bit information of the to-be-executed qubits on the quantum processor 1 and the to-be-executed information of each of the to-be-executed qubits by compiling a quantum computing task to be executed on the quantum processor 1.

It should be noted that a process technology of obtaining, on the specific device, the bit information of the to-be-executed qubits on the quantum processor 1 and the to-be-executed information of each of the to-be-executed qubits by compiling a quantum computing task to be executed on the quantum processor 1 does not belong to content for which protection is sought in the present disclosure. A detailed introduction is not made herein.

Exemplarily, the specific device is a terminal having a function of a processor. Exemplarily, the terminal with the function of the processor is a terminal computer loaded with software for compiling the quantum computing task to be executed on the quantum processor 1, or the terminal with the function of the processor is a server loaded with software for compiling the quantum computing task to be executed on the quantum processor 1.

As an embodiment of the present disclosure, also referring to FIG. 2, the quantum computer architecture system further includes a terminal configured to acquire bit information of to-be-executed qubits on the quantum processor 1 and to-be-executed information of each of the to-be-executed qubits by compiling a quantum computing task to be executed on the quantum processor 1, and send the bit information and the to-be-executed information to the central control apparatus 2. The terminal and the central control apparatus 2 may communicate with each other via a wireless network or a wired network. In some embodiments, the terminal and the central control apparatus 2 communicate with each other via the wired network.

As an embodiment of the present disclosure, the terminal is further configured to send the bit information to the first integration apparatus 3, and the first integration apparatus 3 and the terminal may communicate with each other via a wireless network or a wired network. In some embodiments, the terminal and the central control apparatus 2 communicate with each other via the wireless network. Through the transmission of the bit information between the terminal and the first integration apparatus 3, a design that the first integration apparatus 3 transmits information to the central control apparatus 2 on demand based on the bit information can be realized. Exemplarily, a ready signal indicating that the first integration apparatus 3 is ready to start operating may be sent to a corresponding receiving position in the central control apparatus 2 according to the bit information.

It should be noted that physical hardware of the terminal may be, for example, a computer, a server, or the like.

As an embodiment of the present disclosure, the bit information includes bit quantity information and qubit identification information, and the first control module 22 is configured to determine a to-be-assigned first integration apparatus 3 according to a relationship between the bit quantity information and the first quantity, and assign the to-be-executed information to the determined to-be-assigned first integration apparatus 3 according to the qubit identification information.

Exemplarily, the bit quantity information in the bit information of the to-be-executed qubits on the quantum processor 1 is determined to need 6 qubits, the qubit identification information determines that the 6 qubits are Q0, Q1, Q2, Q3, Q4, and Q5, respectively, and the first quantity is 3. That is, each of the first integration apparatuses 3 controls 3 qubits. Then, two to-be-assigned first integration apparatuses 3 are determined according to the relationship between the bit quantity information and the first quantity, which are assumed to be numbered as a device 1 and a device 2 respectively. The device 1 controls the qubits Q0, Q2, and Q4, and the device 2 controls the qubits Q1, Q3, and Q5. As a result, said assigning the to-be-executed information to the determined to-be-assigned first integration apparatus 3 according to the qubit identification information specifically includes: sending to-be-executed information corresponding to the qubits Q0, Q2, and Q4 to the device 1 and sending to-be-executed information corresponding to the qubits Q1, Q3, and Q5 to the device 2.

It should be noted that the to-be-executed information corresponding to the qubit refers to information related to a quantum logic gate operation to be applied to the qubit, the quantum logic gate operation includes a to-be-operated single quantum logic gate, or a combination of a plurality of quantum logic gates including timing of operations, and the information related to the quantum logic gate operation is waveform information, that is, waveform information corresponding to the single quantum logic gate or waveform information corresponding to the combination of the plurality of quantum logic gates including the timing of operations.

As an embodiment of the present disclosure, also referring to FIG. 2, the first integration apparatus 3 includes first signal modules 31 and a second control module 32.

A quantity of the first signal modules 31 is set to be the first quantity, and each of the first signal modules 31 is configured to provide one qubit with a physical execution signal and receive an execution result signal from the qubit.

Figure 3:
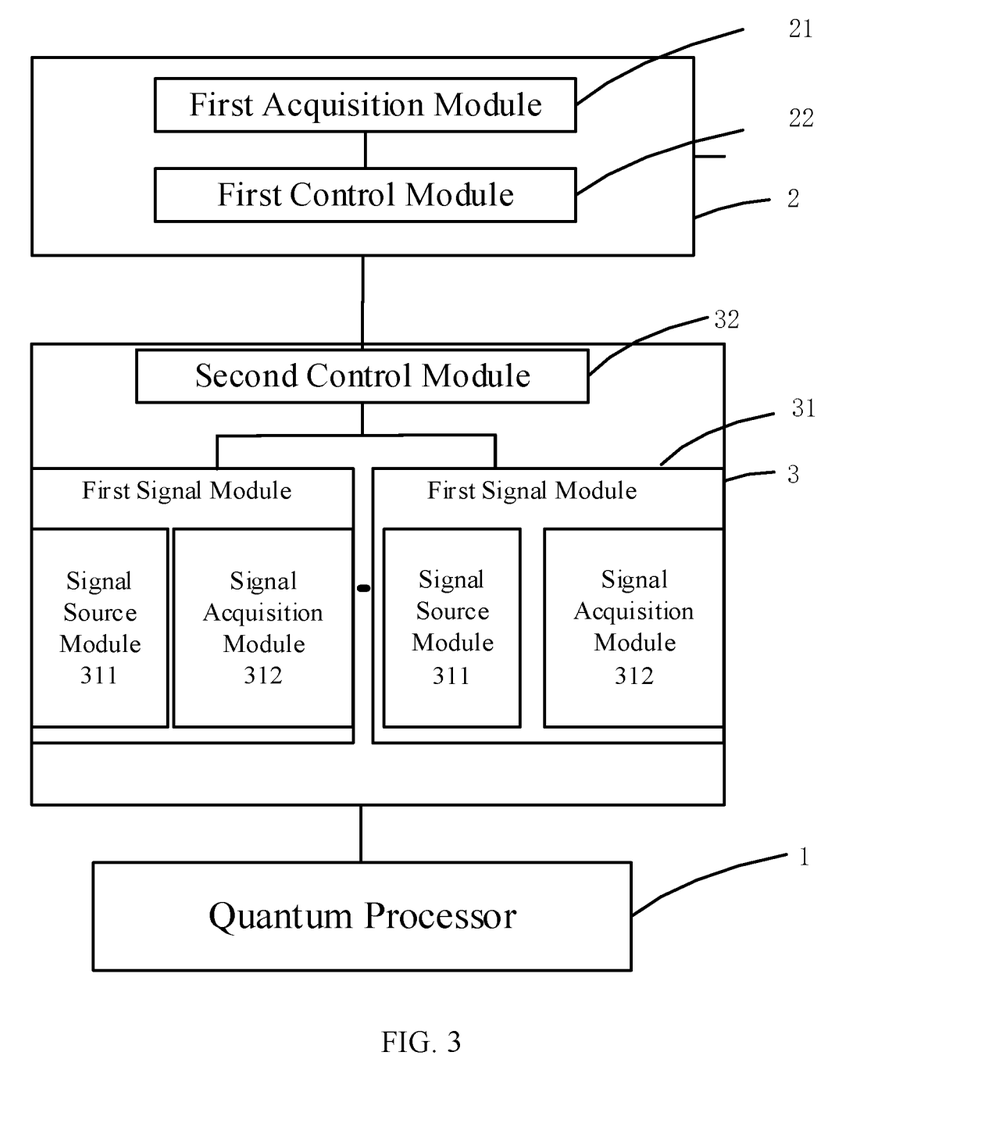
FIG. 3 is a schematic diagram of a quantum computer architecture system according to some embodiments of the present disclosure.

For example, FIG. 3 is a schematic diagram of a quantum computer architecture system according to some embodiments of the present disclosure. As shown in FIG. 3, the first signal module 31 includes a signal source module 311 and a signal acquisition module 312. The signal source module 311 is configured to generate a specific physical execution signal. The signal acquisition module 312 is configured to acquire a signal fed back by the qubit to obtain an execution result signal of the qubit.

It should be noted that according to the function of the physical execution signal generated, the signal source module may be provided as a signal source module with a single function, or a signal source module with an integrated function. Exemplarily, for the superconducting qubits, the superconducting qubits require two types of signals with different functions, namely, a physical execution signal for realizing the quantum logic gate operation to be executed on the qubit and a physical execution signal used to read a quantum state of the qubit respectively. Signal sources that generate the two types of physical execution signals may be configured as a signal source module with an integrated function, or as signal source submodules with separate functions respectively.

It should be noted that, when the signal sources of the physical execution signals that realize different functions are respectively used as the signal source submodules with separate functions, all signal source submodules for one qubit form one signal source module within the first quantity above.

In addition, it should be noted that a process of applying the physical execution signal of each type of function to the qubit and physical hardware implementation are not specifically limited in this embodiment.

In addition, it should be noted that the signal acquisition module 312 may be arranged based on a data acquisition card.

The second control module 32 is connected to the first signal modules 31 and configured to determine and send each piece of the to-be-executed information to the first signal module 31 corresponding to the each piece of the to-be-executed information according to the bit information and a preset relationship between identification information of the first signal module 31 and the qubit identification information, and receive and send the execution result signal to the central control apparatus 2.

Exemplarily, the preset relationship between identification information of the first signal module 31 and the qubit identification information (i.e., preset relationship) is that the qubit identification information Q0, Q1, and Q2 correspond to the first signal module 31 numbered 1, the first signal module 31 numbered 2, and the first signal module 31 numbered 3 in the first integration apparatus 3, respectively.

As a result, said determining and sending each piece of the to-be-executed information to the first signal module 31 corresponding to the each piece of the to-be-executed information according to the bit information and a preset relationship" may include, for example, sending the to-be-executed information corresponding to the qubit Q0 to the first signal module 31 numbered 1 in the first integration apparatus 3.

It should be noted that the to-be-executed information corresponding to the qubit refers to information related to a quantum logic gate operation, a qubit parameter acquisition experimental operation, and a qubit parameter calibration experimental operation to be applied to the qubit. The quantum logic gate operation includes a to-be-operated single quantum logic gate, or a combination of a plurality of quantum logic gates including timing of operations. The information related to the quantum logic gate operation is waveform information, that is, waveform information corresponding to the single quantum logic gate or waveform information corresponding to the combination of the plurality of quantum logic gates including the timing of operations. In this case, the signal source module is configured to generate a physical execution signal for implementing the information related to the quantum logic gate operation. That is, the signal source module is configured to generate a physical execution signal for implementing the waveform information. The qubit parameter acquisition experimental operation includes an energy spectrum experiment of qubit frequency parameter acquisition, a Ramsey experiment of qubit coherence time parameter acquisition, and the like. The related information is experimental waveform information, and the signal source module is configured to generate a physical execution signal for implementing the experimental waveform information.

It should be noted that the to-be-executed information corresponding to the qubit may be information related to a reading measurement operation of the qubit, for example, waveform information of the reading measurement operation of the corresponding qubit, and the signal source module is configured to generate a physical execution signal for implementing the waveform information of the reading measurement operation.

It should be noted that physical hardware of the second control module 32 is hardware for collecting and assigning signals according to a preset addressing rule. The preset addressing rule is established according to a control relationship between the qubit and the first signal module 31. Exemplarily, the control relationship is a preset control relationship or an actual control relationship.

The quantum computer architecture system according to the present disclosure needs to run applications, such as computing to implement a target quantum computing task. If there is a situation in the target quantum computing task that qubits are required to start corresponding execution information at the same moment, the corresponding execution information of the qubits is required to be sent synchronously. Accordingly, in an embodiment of the present disclosure, the first signal module 31 is further configured to generate a ready signal outputted to the central control apparatus 2, receive a trigger signal fed back by the central control apparatus 2 based on the ready signal, and trigger the physical execution signal to be outputted to a qubit, corresponding to the physical execution signal, on the quantum processor 1 based on the trigger signal.

In this embodiment, based on the ready signal outputted by the first signal module 31 and the trigger signal fed back by the central control apparatus 2 based on the ready signal, the first signal module 31 triggers the physical execution signal to be outputted to the corresponding qubit on the quantum processor 1, to realize a requirement that different qubits on the quantum processor 1 execute corresponding execution information at the same time. What is important, the problem is solved that it is difficult to synchronize clocks between the first signal modules 31 of different hardware when the first signal modules 31 corresponding to different qubits output physical execution signals.

In an embodiment of the present disclosure, the second signal module 22 and the first signal modules 31 are arranged on one backboard, and each of the first signal modules 31 is connected to the second control module 22 via a transmission line in the backboard, thus improving the integration degree of the first integration apparatus 3, and improving the integration degree of the quantum computer as a whole.

In an embodiment of the present disclosure, the first integration apparatus 3 is provided in a first space region, and the central control apparatus 2 is provided in a second space region, and the second space region is different from the first space region. In an embodiment, the first integration apparatus 3 may be provided in the first space region defined by a first box, and the central control apparatus 2 may be provided in a second space region defined by a second box. The first integration apparatus 3 and the central control apparatus 2 communicate with each other via a wired network. The first integration apparatus 3 and the central control apparatus 2 are arranged in different boxes, and the first integration apparatus 3 and the central control apparatus 2 communicate with each other via the wired network, thereby facilitating construction of the quantum computer architecture system and improveing integration of the constructed quantum computer architecture system.

The quantum computer architecture system according to the present disclosure needs to run applications, for example, to realize running of a quantum program with a logic control statement. It can be understood that a structure of the logic control statement in the quantum program may be analogous to a logic control statement in a classical program. Exemplarily, a structure of a Qif logic control statement in the quantum program is analogous to an if logic control statement in the classical program, a structure of a Qfor logic control statement in the quantum program is analogous to a for logic control statement in the classical program, and a structure of a Qwhile logic control statement in the quantum program is analogous to a while logic control statement in the classical program. It is different that a control condition of the logic control statement in the quantum program is represented by a quantum circuit, and the control condition depends on an execution result of the qubit in the corresponding quantum circuit. A control execution statement of the logic control statement in the quantum program is also represented by a quantum circuit. Execution of the control execution statement includes, but is not limited to, execution, non-execution, and iterative execution, depending on whether the control condition is met.

Figure 4:
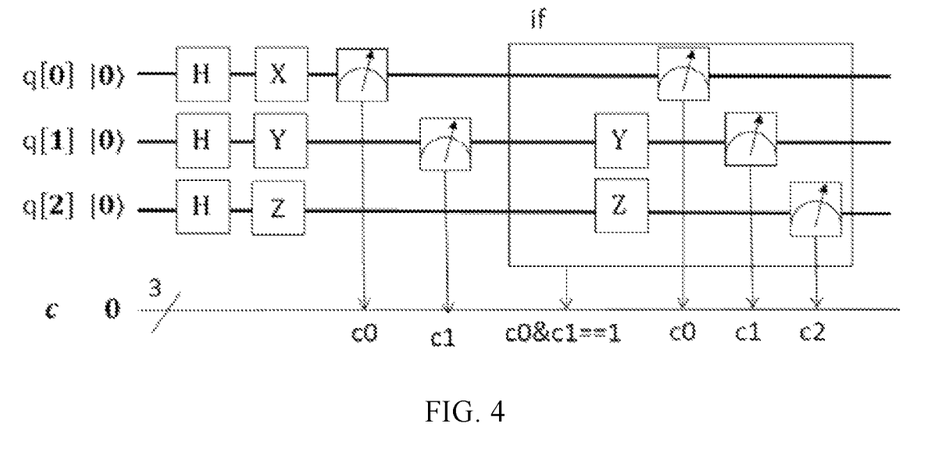
FIG. 4 shows a visual quantum circuit representation of a logic control statement in a quantum program.

The logic control statement in the quantum program is exemplarily introduced with Qif. For example, a visual quantum circuit representation of the logic control statement in the quantum program is shown in FIG. 4. A coded quantum circuit representation of the logic control statement in the quantum program is as follows:

$H(q[0]),H(q[1]),H(q[2]),X(q[0]),Y(q[1]),Z(q[2]),M(q[0],c0),M(q[1],c1);$ $Qif(c0 \& c1==1)$ $Y(q[1]),Z(q[2]),M(q[0],c0),M(q[1],c1),M(q[2],c2).$

In the above example, $q[0]), q[1]$, and $q[2]$ all represent qubits, H, X, Y, and Z all represent quantum logic gates, and $M(q[n], cn)$ indicates measuring a qubit $q[n]$ to obtain an execution result thereof and storing the execution result in a register cn, where n=0, 1, 2.

In the above example, $Qif(c0 \& c1==1)$ indicates that $Y(q[1]), Z(q[2]), M(q[0], c0), M(q[1], c1), M(q[2], c2)$ are executed when a value in a register c0 and a value in a register c1 are both 1.

In order to realize running the quantum program with the logic control statement, the first integration apparatus 3 of the quantum computer architecture system according to the present disclosure is further configured to implement an execution signal of second-type qubits according to an execution result of first-type qubits. The first-type qubits are included in a quantum circuit forming a control condition of a logic control statement. The second-type qubits are included in a quantum circuit forming a control execution statement of a structure of the logic control statement. The control condition depends on an execution result of the qubits of the quantum circuit representing the control condition. It can be understood that the execution result herein is an intrinsic quantum state obtained by quantum state measurement collapse of the qubit. For a qubit, for example, the execution result is 0 or 1.

The first integration apparatus 3 with above configuration can implement a logic control statement of the quantum program in one first integration apparatus 3. The first integration apparatus 3 implements the execution signal of the second-type qubits according to the execution result of the first-type qubits. In an embodiment, the first integration apparatus 3 includes first signal modules 31 and a second control module 32.

A quantity of the first signal modules 31 is set to be the first quantity, a part of the first signal modules 31 are configured to provide the first-type qubits with physical execution signals and receive execution result signals from the qubits, and the other part of the first signal modules 31 are configured to provide the second-type qubits with physical execution signals and receive execution result signals from the qubits.

The second control module 32 is connected to the first signal modules 31 and configured to determine and send to-be-executed information of the second-type qubits to the corresponding first signal modules 31 according to an execution result of the first-type qubits, the bit information, and a preset relationship between identification information of the first signal module 31 and the qubit identification information.

In order to realize running the quantum program with the logic control statement, the central control apparatus 2 of the quantum computer architecture system according to the present disclosure is further configured to implement, according to an execution result of first-type qubits controlled by one of the first integration apparatuses 3, an execution signal of second-type qubits controlled by another one of the first integration apparatuses 3.

The central control apparatus 2 with the above configuration can implement a logic control statement of the quantum program between the central control apparatus 2 and the first integration apparatuses 3. The central control apparatus 2 is configured to implement, according to an execution result of first-type qubits controlled by one of the first integration apparatuses 3, an execution signal of second-type qubits controlled by another one of the first integration apparatuses 3, and is provided with a lookup table of correspondence among the first-type qubits, the first integration apparatus 3 corresponding to the first-type qubits, the second-type qubits, and the first integration apparatus 3 corresponding to the second-type qubits.

In an embodiment, the execution result of the first-type qubits is sent to the central control apparatus 2 through the corresponding first integration apparatus 3, and the central control apparatus 2 determines the serial number of the first integration apparatus 3 corresponding to to-be-executed second-type qubits according to the execution result of the first-type qubits, and the built-in lookup table of correspondence among the first-type qubits, the first integration apparatus 3 corresponding to the first-type qubits, the second-type qubits, and the first integration apparatus 3 corresponding to the second-type qubits.

In the description of the specification, reference terms such as "an embodiment", "some embodiments", "examples", and "specific examples" mean that a particular feature, structure, material, or characteristic described in connection with the embodiment or example is included in at least one embodiment or example of the present disclosure. In the specification, the schematic expressions to the above terms are not necessarily referring to the same embodiment or example. Moreover, the particular feature, structure, material, or characteristic described may be combined in one or more embodiments in any appropriate manner. In addition, those skilled in the art may combine and combine different embodiments or examples described in this specification.

The above are only preferred embodiments of the present disclosure, and do not limit the present disclosure in any way. Any equivalent replacement or modification made by any person skilled in the art to the technical solution and the technical content disclosed in the present disclosure without departing from the scope of the technical solution of the present disclosure does not depart from the content of the technical solution of the present disclosure and still falls within the protection scope of the present disclosure.

What is claimed is:

1. A quantum computer architecture system, comprising:
    a quantum processor, comprising a plurality of qubits;
    a first integration apparatus, configured to implement an execution signal and aggregation of execution results of a first quantity of qubits on the quantum processor; and
    a central control apparatus, configured to acquire bit information of to-be-executed qubits on the quantum processor and to-be-executed information of each of the to-be-executed qubits, assign the to-be-executed information to one or more first integration apparatuses according to the bit information and the first quantity, and receive the aggregation of the execution results from the one or more first integration apparatuses,
    wherein the first integration apparatus comprises:
        first signal modules, wherein a quantity of the first signal modules is the first quantity, and wherein each of the first signal modules is configured to provide one qubit with a physical execution signal and receive an execution result signal from the qubit; and
        a second control module connected to the first signal modules and configured to determine and send each piece of the to-be-executed information to a first signal module corresponding to the each piece of the to-be-executed information according to a relationship among the bit information, preset first signal module identification information, and the qubit identification information, and receive and send the execution result signal to the central control apparatus.

2. The quantum computer architecture system according to claim 1, wherein the central control apparatus comprises:
    a first acquisition module configured to acquire the bit information of the to-be-executed qubits on the quantum processor and the to-be-executed information of each of the to-be-executed qubits; and
    a first control module configured to assign the to-be-executed information to the one or more first integration apparatuses according to the bit information and the first quantity, and receive the aggregation of the execution results from the one or more first integration apparatuses.

3. The quantum computer architecture system according to claim 2, wherein the bit information comprises bit quantity information and qubit identification information; and
    wherein the first control module is configured to determine a to-be-assigned first integration apparatus according to a relationship between the bit quantity information and the first quantity, and assign the to-be-executed information to the determined to-be-assigned first integration apparatus according to the qubit identification information.

4. The quantum computer architecture system according to claim 1, wherein the first signal modules comprise a signal source module and a signal acquisition module.

5. The quantum computer architecture system according to claim 4, wherein the to-be-executed information is information related to a quantum logic gate operation, a qubit parameter acquisition experimental operation, and a qubit parameter calibration experimental operation of the qubit, and the signal source module is configured to generate a physical execution signal for implementing the information related to the quantum logic gate operation, the qubit parameter acquisition experimental operation, and the qubit parameter calibration experimental operation.

6. The quantum computer architecture system according to claim 4, wherein the to-be-executed information is information related to a reading measurement operation of the qubit, and the signal source module is configured to generate a physical execution signal for implementing the reading measurement operation.

7. The quantum computer architecture system according to claim 1, wherein the first signal modules are further configured to generate a ready signal outputted to the central control apparatus, receive a trigger signal fed back by the central control apparatus based on the ready signal, and trigger the physical execution signal to be outputted to a qubit, corresponding to the physical execution signal, on the quantum processor based on the trigger signal.

8. The quantum computer architecture system according to claim 1, wherein the second signal module and the first signal modules are located on a backboard; and
    wherein each of the first signal modules is connected to the second control module via a transmission line in the backboard.

9. The quantum computer architecture system according to claim 1, wherein the first integration apparatus is provided in a first space region, and the central control apparatus is provided in a second space region, and wherein the second space region is different from the first space region; and
    wherein the first integration apparatus and the central control apparatus communicate with each other via a wired network.

10. The quantum computer architecture system according to claim 1, further comprising a terminal configured to acquire bit information of to-be-executed qubits on the quantum processor and to-be-executed information of each of the to-be-executed qubits by compiling a quantum computing task to be executed on the quantum processor, and send the bit information and the to-be-executed information to the central control apparatus.

11. The quantum computer architecture system according to claim 10, wherein the terminal and the central control apparatus communicate with each other via a wired network.

12. The quantum computer architecture system according to claim 1, wherein the first integration apparatus is further configured to implement an execution signal of second-type qubits according to an execution result of first-type qubits; and
   wherein the first-type qubits are comprised in a quantum circuit forming a control condition of a logic control statement; and the second-type qubits are comprised in a quantum circuit forming a control execution statement of a structure of the logic control statement; wherein the control condition depends on an execution result of the qubits of the quantum circuit representing the control condition.

13. The quantum computer architecture system according to claim 1, wherein the central control apparatus is further configured to implement, according to an execution result of first-type qubits controlled by one of the first integrated apparatuses, an execution signal of second-type qubits controlled by another of the first integrated apparatuses; and
   wherein the first-type qubits are comprised in a quantum circuit forming a control condition of a logic control statement; and the second-type qubits are comprised in a quantum circuit forming a control execution statement of a structure of the logic control statement; wherein the control condition depends on an execution result of the qubits of the quantum circuit representing the control condition.

14. The quantum computer architecture system according to claim 13, wherein the central control apparatus is provided with a lookup table of correspondence among the first-type qubits, the first integration apparatus corresponding to the first-type qubits, the second-type qubits, and the first integration apparatus corresponding to the second-type qubits.

* * * * *